United States Patent [19]

VanLoon et al.

[11] Patent Number: 4,556,223
[45] Date of Patent: Dec. 3, 1985

[54] SEALING MEANS WITH SPACED ANNULAR SEALS HAVING SUPPORT RINGS

[75] Inventors: Donald F. VanLoon, Painted Post; Bernard F. Miller, Corning, both of N.Y.

[73] Assignee: Ingersoll-Rand Company, Woodcliff, N.J.

[21] Appl. No.: 636,433

[22] Filed: Jul. 31, 1984

Related U.S. Application Data

[63] Continuation-in-part of Ser. No. 479,437, Mar. 28, 1983, abandoned.

[51] Int. Cl.⁴ ............................................. F16J 15/38
[52] U.S. Cl. ...................................... 277/118; 277/84; 277/125; 277/188 R; 277/198
[58] Field of Search ..................... 277/82–84, 277/116.2, 116.8, 117–123, 125, 188 R, 188 A, 190, 191, 198, 203

[56] References Cited

U.S. PATENT DOCUMENTS

| 642,411 | 1/1900 | Allen | 277/121 |
| 807,538 | 12/1905 | Bole | 277/105 |
| 1,350,553 | 8/1920 | Mack | 277/125 X |
| 2,747,903 | 5/1956 | Heinrich | 277/84 X |
| 3,287,022 | 11/1966 | Soechting | 277/123 X |
| 3,473,814 | 10/1969 | Bastow | 277/188 A |
| 3,554,280 | 1/1971 | Tucker | 277/125 X |
| 3,614,114 | 10/1971 | Traub | 277/188 R X |
| 3,663,076 | 5/1972 | Valente | 277/120 X |
| 4,032,159 | 6/1977 | Zitting | 277/188 A X |
| 4,059,280 | 11/1977 | Eastwood | 277/188 A |
| 4,152,926 | 5/1979 | Hasha | 277/188 A X |
| 4,362,304 | 12/1982 | Hunger | 277/198 X |

FOREIGN PATENT DOCUMENTS

| 582888 | 10/1958 | Italy | 277/123 |
| 25491 | of 1896 | United Kingdom | 277/118 |
| 6788 | of 1904 | United Kingdom | 277/118 |
| 10446 | of 1908 | United Kingdom | 277/118 |
| 559736 | 3/1944 | United Kingdom | 277/203 |
| 1316841 | 5/1973 | United Kingdom | 277/188 A |
| 1316842 | 5/1973 | United Kingdom | 277/123 |

*Primary Examiner*—Robert S. Ward
*Attorney, Agent, or Firm*—B. J. Murphy

[57] ABSTRACT

A seal of annular configuration sealingly engaged with an annular surface of an element, to inhibit a communication thereacross of low- and high-pressure environments of the surface, and either one, or a pair of annular support rings engaging the seal. The seal and rings have interfacing and tapered or inclined surfaces and, consequently, the seal is restrained against (a) an unwarranted movement toward the surface being sealed, thereby to prevent its unwarranted extrusion, and (b) heavy radial gas force in that the gas forces act axially and radially on the support rings.

9 Claims, 11 Drawing Figures

SEALING MEANS WITH SPACED ANNULAR SEALS HAVING SUPPORT RINGS

This application is a continuation-in-part of application Ser. No. 479,437, filed on March 28, 1983 and now abandoned.

This invention pertains to sealing means, and in particular to sealing means especially configured for use in high pressure fluid sealing arrangements.

In high-pressure fluid sealing applications, for instance in reciprocating gas compressors, Teflon sealing rings are commonly used on the pistons and/or the piston rods. However, such sealing rings, whether lubricated or non-lubricated, have a high and early mortality. The material thereof extrudes through clearance spaces, and wears away through the heat of friction. Too, the higher fluid pressures unduly advance the surface of the seal into the wall of the cylinder or the piston rod circumference. The known seals are commonly flat-sided and, accordingly, have no means therein, or associated therewith, for restraining them against radial deflection.

It is an object of this invention to set forth novel sealing means which avoid the aforesaid problems and have means for restraining the same against radial deflection.

Particularly it is an object of this invention to teach means for sealing an annular surface of an elongate element between high and low fluid pressure environments of the surface, comprising a plurality of one-piece, annular seals; wherein each of said seals fully circumferentially sealingly engages a given portion of said surface; said seals are spaced apart from each other lengthwise of said element; each of said seals has an inside diametrical surface and an outside diametrical surface; and each of said seals has an inclined side surface, joining said inside and outside surfaces, which defines one of said diametrical surfaces as of shorter axial length than the other thereof; and further including support rings for said seals; each said support ring having an inclined side surface which (a), in conformation, is a mirror-image complement of, and (b), defines an engaging interface with a said inclined side surface of one of said seals; and spacer means (a) interposed between said seals and (b) circumjacent said other diametrical surfaces of said seals, defining first annular voids between (a) said spacer means and said other diametrical surfaces and (b) second annular voids between said spacer means and side surfaces of said seals.

Further objects of this invention, as well as the novel features thereof, will become more apparent by reference to the following description, taken in conjunction with the accompanying figures, in which.

Figure 5:
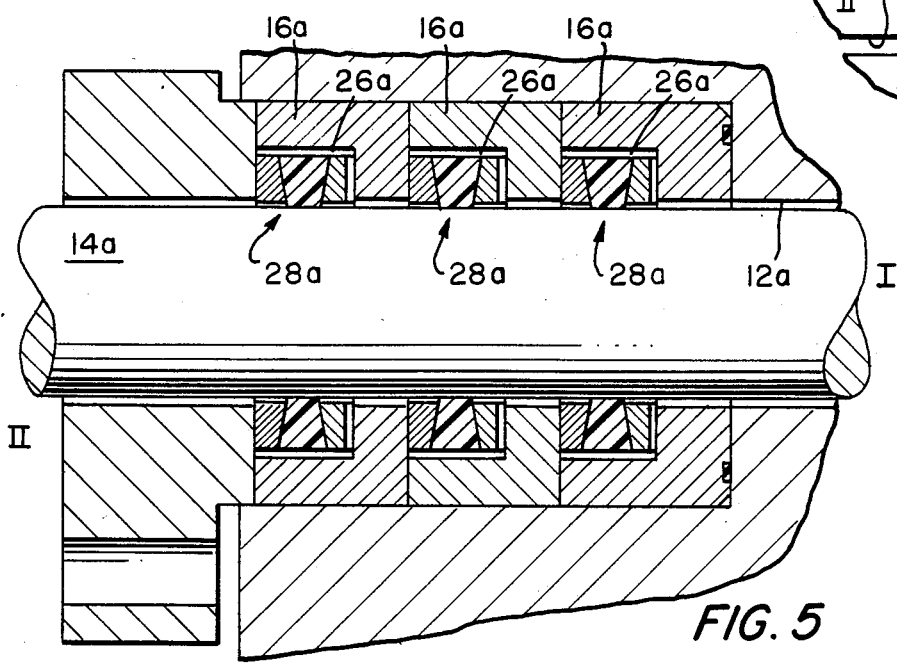
FIG. 5 is a view like that of FIG. 1, but of an alternative embodiment of the invention in use with a piston rod.
Figure 11:
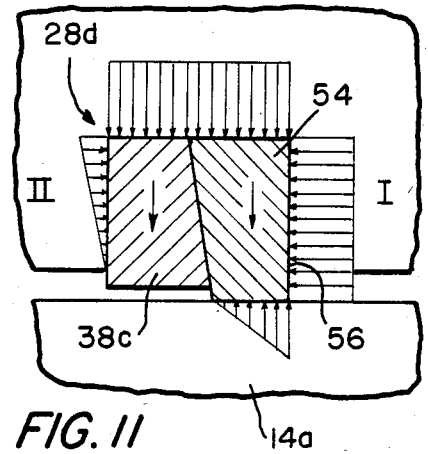
Figure 10:
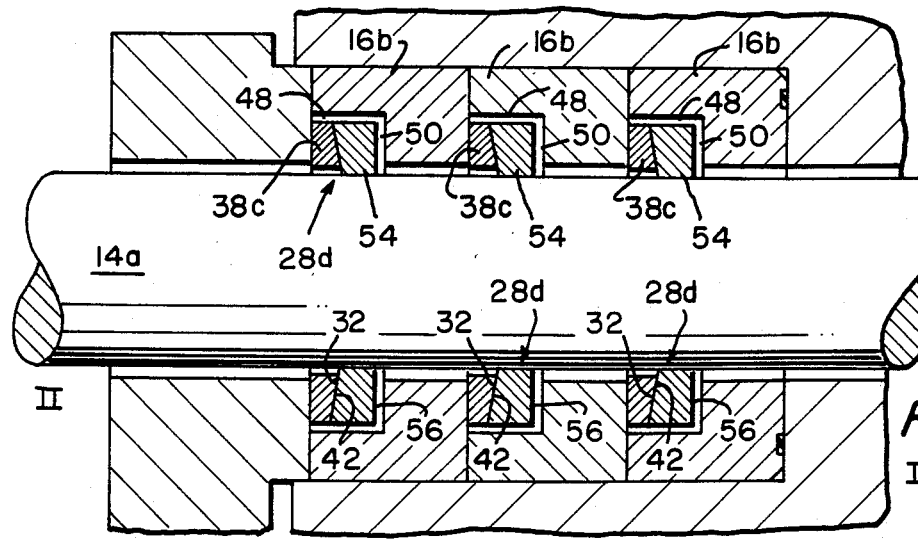

FIG. 10 corresponds, generally, to the arrangement shown in FIG. 5, albeit illustrative of a fifth embodiment of the invention; and FIG. 11 is a diagram of the fluid pressure loading across the fifth embodiment of the invention.

As shown in the FIGS. 1–4, a build-up piston 10 is disposed for reciprocation in a cylinder 12 of a high-pressure gas compressor (not shown). The piston 10 has a rod 14 along which are stacked, in alternating fashion, large diameter, centrally apertured, plates 16 and small diameter plates 18, as well as a centrally apertured spacer 20 and, finally, a piston head 22. The piston head 22 is centrally threaded, and is threadedly engagaed with the complementary-threaded end of the rod 14. An O-ring seal 24 is set on the rod 14 between the spacer 20 and the thereadjacent plate 16.

The small diameter plates 18 cooperate with the confronting plates 16 to serve as means for spacing apart the novel sealing means 28, and to define, therebetween, a plurality of annular recesses 26 in which to nest the novel sealing means 28 of the invention, according to a first embodiment thereof.

Sealing means 28 comprises a circumferentially continuous, i.e. a circularly complete, annular seal 30 which, in this embodiment of the invention, is formed of Teflon. The opposite side surfaces 32 amd 34 of the seal 30 are dished or conical, defining the cross-section of the seal as a converging taper from the inside diameter to the outside diameter. The convergence, relative to a plane "P" which is perpendicular to the axially extended surface of the cylinder 12, is not more than approximately ten degrees of arc.

Seal 30 is confined in its given recess 26 by a pair of support rings 36 and 38 which, in this embodiment, are formed of bronze. Each of the aforesaid rings has a side surface 40 and 42, respectively, which interfaces a side surface 34 or 32 of the seal and is a mirror-image complement of its confronting, seal side surface. On its opposite said surface 44, support ring 36 has a plurality of radial grooves 46. Surface 44 is predetermined to be the pressure side of the sealing means 28, and grooves 46 are formed therein to admit high-pressure fluid therealong.

Seal 30 and rings 36 and 38 have a common inside diameter "i.d.", but seal 30 has a slightly greater outside diameter, than rings 36 and 38, as represented by the dimension "X". Consequently, seal 30 fully circumferentially engages the circumference of a portion of the wall of the cylinder 12 to inhibit communication between a given high-pressure side "I" of the cylinder with the low-pressure side "II". Rings 36 and 38 are slightly spaced apart from the wall of the cylinder 12 by the aforesaid dimension "X".

Figure 1:
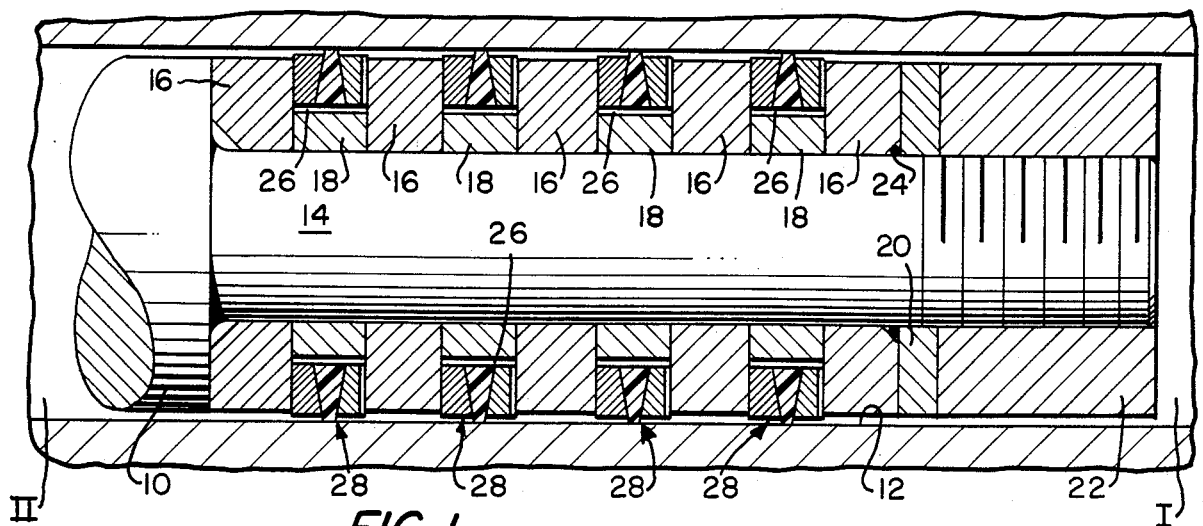
FIG. 1 is a cross-sectional view of a first embodiment of the invention in use with a piston taken along the longitudinal axis thereof.
Figures 2, 3, 4:
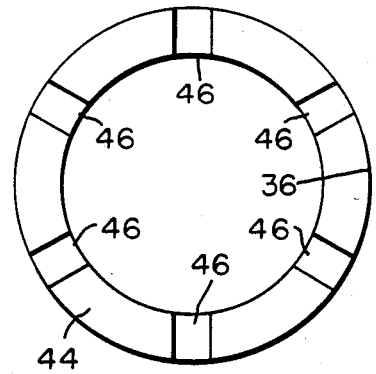
FIG. 2 is a cross-sectional view, like that of FIG. 1, of a sealing means used on the piston of FIG. 1.
FIG. 3 is an elevational view of the front support ring, taken from the right side of FIG. 2.
FIG. 4 is a diagram of the fluid pressure loading across the sealing means in the piston application.

Rings 36 and 38 confine and support the seal 30 in its recess 26 but, additionally, they inhibit any undue movement of the seal 30 toward the wall of the cylinder 12. In having converging and seal-engaged side surfaces 42 and 40, the rings 36 and 38 restrain the seal 30 against undue radial expansion, whereby inordinate extrusion of the seal is prevented. Even so, as the pressure-distribution diagram of FIG. 4 shows, the seal 30 manifests a pressure-induced sealing of the wall of the cylinder 12. The inside diameter surface of the seal 30 has the full pressure of side "I" impressed thereon, to urge the seal into such sealing engagement. Yet, the inwardly-converging, cross-sectional tapers of the rings 32 and 34, in fast engagement with the complementary, cross-sectional taper of the seal 30, produce a girdling restraint of the seal 30.

Figure 7:
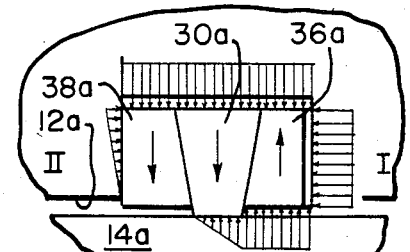
FIG. 7 is a diagram of the fluid pressure loading across the alternative sealing means in the piston rod application.
Figure 6:
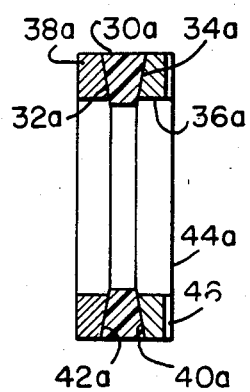
FIG. 6 is a view, like that of FIG. 2, of the alternative sealing means of FIG. 5.

In the alternative embodiment of the novel sealing means 28a shown in FIGS. 5-7 same or similar index numbers denote same or similar parts, dimensions, etc. as in the embodiment of FIGS. 1-4. This latter embodiment, however, comprises the practice of the invention in an application which is somewhat the complement of the FIGS. 1-4 practice.

Sealing means 28a are employed, only by way of example, in a packing or stuffing-box application. Rod 14a reciprocates in a housing having a cylindrical bore 12a, and a plurality of cup-shaped, centrally-bored discs 16a are stacked, side-by-side, along the rod 14a within a recess provided therefor in the housing. The discs 16a present annular recesses 26a in which to nest the novel sealing means 28a, and serve as spacing means for the sealing means 28a.

Sealing means 28a functions quite as described for sealing means 28, except that this second embodiment seals circumferentially about the surface of the rod 14a. In this embodiment, then, the outside diameters of the seal 30a and the rings 36 and 38 are of one common dimension, and the inside diameter of the seal 30a is smaller than the inside diameter of the rings 36a and 38a.

The further embodiments of the invention, shown in FIGS. 8-11, are identified with same or similar index number as in FIGS. 1-7 to denote same or similar components.

Figure 8:
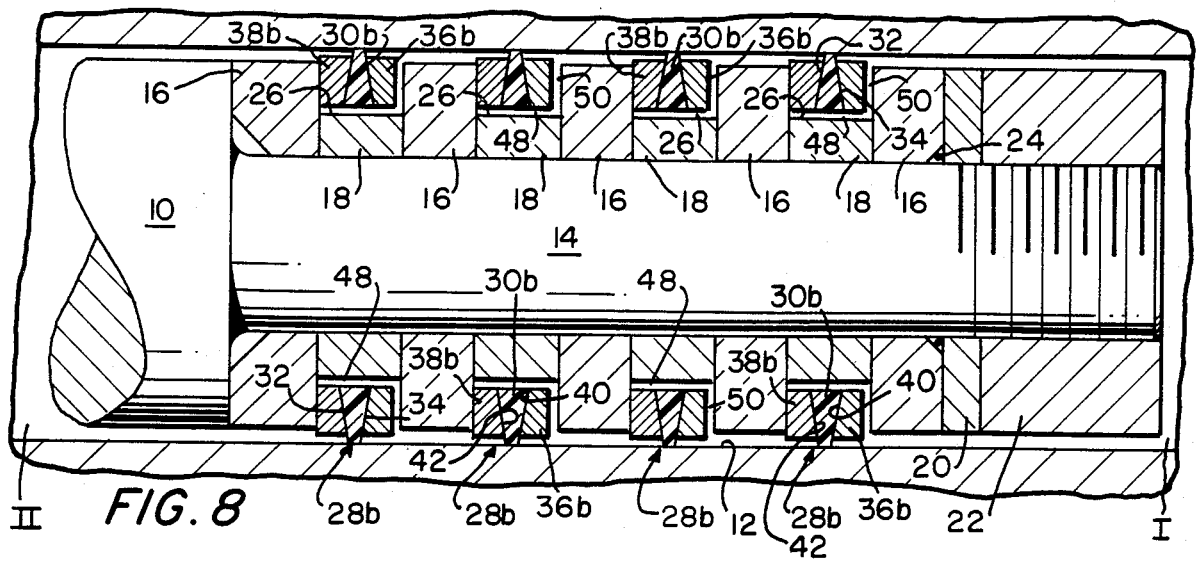
FIG. 8 is a cross-sectional view of a third embodiment of the invention, the illustration substantially corresponding to the arrangement shown in FIG. 1.

In FIG. 8, the sealing means 28b are quite similar to sealing means 28 (FIG. 1) except that they are not axially restrained. Between plates 18, and seals 30b and rings 36b and 38b there obtain first annular voids 48, and between rings 36b and the there adjacent plates 16 there obtain second annular voids 50. In this embodiment, grooves 46 (FIGS. 2 and 3) are dispensed with. However, if desired, to enhance fluid admittance along ring 36b, they may be added.

Rings 36b and 38b are formed of bronze, in this embodiment, and the seals 30b are formed of polytetrafluorethylene. The bronze rings 36b and 38b are of one-piece construction, and so are the seals 30b, and accomodate high pressure, high cyclic rate, non-lubricated applications. The hard rings 36b and 38b are non-bearing, and are primarily for pressure balancing of the seals 30b. The high pressure fluid (gas) forces act axially and radially on the rings 36b and 38b to restrain the seals 30b against the heavy radial fluid pressure acting thereon.

As noted, the sealing means 28b are not axially restrained; they require no mechanical/axial take-up. The seals 30b, then, are self-compensating. This lowers the unit load on the sealng face of the seals 30b and, consequently, a lower wear rate results therefrom. Each seal 30b is actually a self-disposing wear element, with a narrow wear surface. As a first seal 30b, adjacent the high pressure end "I" wears enough to leak fluid, the next seal 30b commences to seal. With the plurality of sealing means 28b, the wear life of the whole piston assembly is greatly extended.

When the machine, i.e., gas compressor, is started up and the fluid is applied to end "I", the heat of friction on the narrow sealing surface of the seals 30b causes the latter to expand. Initially, then, the seals 30b most tightly seal against the wall of the cylinder 12. Then as the high, operating fluid pressure is achieved the seals 30b proceed to deform and, consequently, require restraint by support rings 36b and 38b.

Seals 30b have the inclined side surfaces 32 and 34 which define the inside diameters thereof of greater width or axial length then the outside diameters, i.e., the sealing surfaces thereof. Rings 36b and 38b too have complementary, inclined side surfaces 40 and 42 by means of which they restrain the seals 30b with which they interface. Experimentally, it has been determined that relieving a portion of the support ring on the high-pressure side of the sealing means can enhance the pressure-balancing and restraint of the seals. This alternative practice is shown in FIG. 9.

Figure 9:
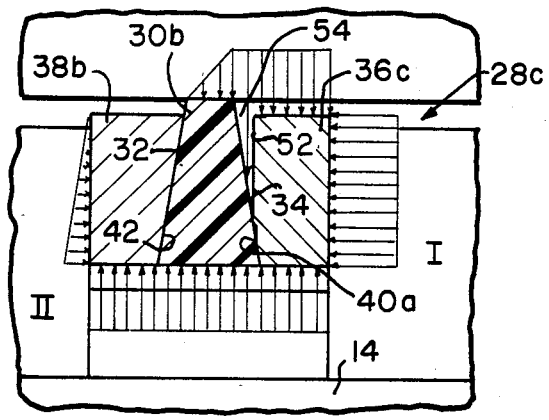
FIG. 9 is a view similar to that of FIG. 4 depicting a fourth embodiment of the invention.

Sealing means 28c, in FIG. 9, is quite like sealing means 28b of FIG. 8, except that support ring 36c is relieved. The side surface of ring 36c which confronts seal 30b has a partial inclined surface 40a, for mating with surface 34 of seal 30b, and a relieved surface 52 spaced apart from surface 34. This defines a wedge-shaped space 54 into which the high-pressure fluid (gas) is admissable to load the seal 30b.

The further embodiment of sealing means 28d, in FIGS. 10 and 11, exemplify additional features of the invention. Herein the support rings 38c are formed of steel, and the seals 54 are formed of bronze. Such sealing means 28d ca be used for lubricated service in machines (gas compressors) which produce extremely high fluid pressures. In addition, only one support ring 38c is employed with each seal 54. Side surfaces 42 and 32 interface, as in the prior embodiments, to restrain the seal 54 at one side thereof. However the full fluid pressure at end "I" is brought to bear against the flat side 56 of the seal(s) 54. The force of the fluid pressure on side 56, in combination with the inclined surface 42 of ring 38c, is sufficient to restrain the seal 54 against the radially-imposed pressure loading thereof. This embodiment of the invention is illustrated in association with the bronze seal 54 and steel support ring 38c for exemplary purposes only. However, it can be practiced as well with a bronze support ring and a polytetrafluorethylene seal in non-lubricated and less then extemely high pressure service.

While we have described our invention in connection with specific embodiments thereof, it is to be clearly understood that this is done only by way of example, and not as a limitation to the scope of our invention as set forth in the objects thereof and in the appended claims.

We claim:

1. Means for sealing an annular surface of an elongate element between high and low fluid pressure environments of the surface comprising:
    a plurality of one-piece, annular seals; wherein
    each of said seals fully circumferentially sealingly engages a given portion of said surface;
    said seals are spaced apart from each other lengthwise of said element;
    each of said seals has an inside diametrical surface and outside diametrical surface; and
    each of said seals has an inclined side surface, joining said inside and outside surfaces which define one of said diametrical surfaces of shorter axial length than the other thereof; and further including support rings for said seals;

each said support ring having an inclined side surface which (a), in conformation, is a mirror-image complement of, and (b), defines an engaging interface with a said inclined side surface of one of said seals; and spacer means (a) interposed between said seals and (b) circumjacent said other diametrical surfaces of said seals, defining first annular voids between (a) said spacer means and said other diametrical surfaces and (b) second annular voids between said spacer means and side surfaces of said seals.

2. Sealing means, according to claim 1, wherein:

one end of said element comprises a high-pressure fluid-environment-end thereof, and the other end of said element comprises a low-pressure-fluid-environment-end thereof; and said second voids are more proximate to said high-pressure-fluid-environment-end of said element than to said other, low-pressure-fluid-environment-end thereof.

3. Sealing means, according to claim 1, wherein:

each of said seals has said inclined side surfaces on both sides thereof;

pairs of said support rings define engaging interfaces with said both sides of said seals; and each said support ring has a diametrical surface, in immediate adjacency to said one diametrical surface of its interfacing seal, of smaller diameter than said one diametrical surface of said seal, whereby said diametrical surfaces of said support rings are spaced apart from said annular surface of said elongate element.

4. Sealing means, according to claim 1, wherein:

said seals are formed of a given material; and said support rings are formed of a material which is harder than said given material.

5. Sealing means, according to claim 3, wherein:

one support ring, of at least one pair thereof which interfaces both sides of one of said seals, has a portion of said side surface thereof, which confronts said one seal, which (a) is relieved, and (b) defines thereat a wedge-shaped space between said portion and said seal.

6. Sealing means, according to claim 1, wherein:

each of said seals has but one of said support rings interfacingly engaged therewith;

said diametrical surfaces of said seals are flat and concentric;

said other side surfaces of said seals are flat and lie normal to said diametrical surfaces thereof; and said spacer means have surfaces which lie parallel with said other side surfaces of said seals.

7. Sealing means, according to claim 1, wherein:

said seals are formed of plastic; and said support rings are formed of metal.

8. Sealing means, according to claim 1, wherein:

said seals and said support rings are formed of metal.

9. Sealing means, according to claim 8, wherein:

said seals are formed of bronze; and said support rings are formed of steel.

* * * * *